United States Patent [19]

Walker

[11] Patent Number: 5,411,670

[45] Date of Patent: May 2, 1995

[54] METHOD AND COMPOSITION FOR PROTECTING METAL SURFACES FROM OXIDATIVE ENVIRONMENTS

[75] Inventor: Michael L. Walker, Duncan, Okla.

[73] Assignee: Halliburton Company, Duncan, Okla.

[21] Appl. No.: 97,445

[22] Filed: Jul. 26, 1993

Related U.S. Application Data

[63] Continuation of Ser. No. 889,212, May 27, 1992, abandoned, which is a continuation-in-part of Ser. No. 608,877, Nov. 5, 1990, abandoned.

[51] Int. Cl.$^6$ ............... C23F 11/04; C23F 11/14
[52] U.S. Cl. ................ 507/117; 106/14.11; 106/14.13; 507/140; 507/130; 507/131; 507/129; 524/409; 524/410
[58] Field of Search ............ 252/8.555, 8.553; 106/14.11, 14.13

[56] References Cited

U.S. PATENT DOCUMENTS

| | | | |
|---|---|---|---|
| 2,489,668 | 11/1949 | Plati et al. | 260/570.5 |
| 2,758,970 | 8/1956 | Saukaitis et al. | 252/8.55 |
| 3,077,454 | 2/1963 | Monroe et al. | |
| 3,094,490 | 6/1963 | Gardner et al. | 252/149 |
| 3,630,933 | 12/1971 | Dudlik et al. | 252/148 |
| 3,634,270 | 1/1972 | Engle et al. | 252/149 |
| 3,896,044 | 7/1975 | Mago et al. | 252/192 |
| 3,932,296 | 1/1976 | Byth . | |
| 4,466,890 | 8/1984 | Briscoe | 252/8.55 |
| 4,493,775 | 1/1985 | Coffey et al. | 252/8.55 |
| 4,498,997 | 2/1985 | Walker . | |
| 4,522,658 | 6/1985 | Walker | 148/6.14 |
| 4,552,672 | 11/1985 | Walker | 252/8.55 |
| 4,676,834 | 6/1987 | Treybig | 106/14.15 |
| 5,089,153 | 2/1992 | Williams et al. | 252/8.555 |
| 5,120,471 | 6/1992 | Jasinski et al. | 252/389.54 |

FOREIGN PATENT DOCUMENTS 0212752  3/1987  European Pat. Off. .
0276879  8/1988  European Pat. Off. .

OTHER PUBLICATIONS

Foley et al, "Corrosion and Corrosion Inhibitors" in: *Kirk-Othmer Encyclopedia of Chemical Technology* (3rd ed.), vol. 7, pp. 135–142.

Dunlop, A. K. "Corrosion Inhibition in Secondary Recovery" in: *Corrosion Inhibitors* (National Association of Corrosion Engineers, Houston, Tex., 1973) pp. 76–88.

*Primary Examiner*—Gary Geist
*Attorney, Agent, or Firm*—Robert A. Kent; Clifford C. Dougherty, III

[57] ABSTRACT

A method and coating composition for producing protective coatings on metal surfaces of tubular goods, equipment and so forth used in processes associated with oxidative environments to inhibit corrosive effects of the oxidative environments thereon. The coating composition includes an aqueous liquid carrier and a corrosion inhibiting combination of a specific condensation product and an antimony compound. The antimony compound is activated by the condensation product and enhances the degree of protection achieved.

34 Claims, No Drawings

METHOD AND COMPOSITION FOR PROTECTING METAL SURFACES FROM OXIDATIVE ENVIRONMENTS

CROSS REFERENCE TO RELATED APPLICATION

This is a continuation of application Ser. No. 07/889,212 filed on May 27, 1992, now abandoned, which is a continuation-in-part application of prior application Ser. No. 07/608,877, filed Nov. 5, 1990, now abandoned.

BACKGROUND OF THE INVENTION

This invention relates in general to methods and compositions for protecting metal surfaces exposed to oxidative environments. The invention relates more particularly to methods and compositions for forming protective coatings on metal surfaces to inhibit the corrosive effects of oxidative environments thereon.

A common problem encountered in processes associated with oxidative environments such as processes for producing or enhancing the production of oil and/or gas from subterranean formations is corrosion of the metal surfaces of tubular goods and equipment used in the processes. The expense of repairing or replacing tubular goods and equipment damaged due to corrosion is extremely high.

Corrosion of metal surfaces is caused by a variety of oxidative environments. For example, in acidizing and fracturing treatments carried out to increase the permeability of subterranean formations, aqueous solutions containing acids and other corrosive compounds are typically introduced into the subterranean formations under pressure. The acid and other corrosive compounds can corrode metal surfaces of conduits, mixing tanks, pumps, casing and the like when contacted therewith. After the treatment is complete, the involved metal surfaces are still subject to attack by corrosive solutions and compounds such as brine, carbon dioxide and hydrogen sulfide remaining with spent treatment fluids, present in fluids that are produced from the formation and so forth. Damage to metal surfaces is exacerbated in oxidative environments associated with hostile conditions such as elevated temperatures.

Various methods and compositions have been proposed to solve or decrease the problems to metal surfaces caused by oxidative environments. Most methods and compositions developed heretofore, however, are not effective at temperatures above about 300 F. and/or do not form a protective coating that provides residual protection for an extended period of time.

SUMMARY OF THE INVENTION

In accordance with the present invention, a method and composition for producing a uniform protective coating on a metal surface to inhibit corrosion of the surface by one or more oxidative environments in contact therewith is provided.

The method comprises contacting the metal surface with a coating composition at a temperature and for a period of time sufficient to form a protective coating of at least a portion of the components of the coating composition on the metal surface.

The coating composition has a pH below 7 and includes an aqueous liquid carrier and a corrosion inhibiting combination of a specific condensation product and at least one antimony compound present in the liquid carrier. The antimony compound(s) of the corrosion inhibiting combination are antimony compounds that are capable of activation by the condensation product to enhance the degree of inhibition of corrosion of the metal surface achieved by the condensation product.

The condensation product of the corrosion inhibiting combination of the coating composition is prepared by reacting at least four reaction constituents together in the presence of from about 0.8 to about 1.2 equivalents of an aqueous mineral acid catalyst at a temperature in the range of from about 140 to about 250 F. for in the range of about 4 to about 48 hours. The reaction constituents include:

(a) about one equivalent of a group (i) constituent having at least one reactive hydrogen atom and no groups reactive under the conditions of reaction other than hydrogen, the group (i) constituent including at least one member selected from the group consisting of amines, amides, thioamides, aldehydes, nitrogen heterocycles, ketones, phenols, acetylenic alcohols, carboxylic acids, esters of carboxylic acids, and substituted derivatives thereof;

(b) from about 0.6 to about 10 equivalents of a group (ii) constituent, the group (ii) constituent including a carbonyl group and having at least one hydrogen atom on the carbon atom adjacent to the carbonyl group;

(c) from about 0.5 to about 10 equivalents of a group (iii) constituent, the group(iii) constituent being an aldehyde; and (d) from about 0.10 to about 10 equivalents of a group (iv) constituent, the group (iv) constituent being selected from a fatty compound having from 5 to 60 carbon atoms, an alkyl nitrogen heterocycle having at least one alkyl group having from 1 to 18 carbon atoms and having 3 to 9 carbon atoms in the heterocyclic ring structure, and admixtures thereof, wherein each of the group (i) constituent, group (ii) constituent, group (iii) constituent and group (iv) constituent are preferably different compounds or different mixtures of compounds.

In one embodiment, the antimony compound(s) are present in the corrosion inhibiting combination of the coating composition in an amount sufficient to impart a molar concentration of antimony ions in the composition of from about 0.0001 to about 0.1.

In another embodiment, the coating composition further includes at least one additional compound selected from quaternary ammonium compounds, aromatic hydrocarbons having high oil wetting characteristics, solvents and surfactants for facilitating dispersion of the corrosion inhibiting combination of the condensation product and antimony compound(s) and other components used throughout the liquid carrier. The additional compound(s) employed and the group (i) through (iv) constituents of the condensation product are preferably different compounds or different mixtures of compounds. The coating composition does not require the use of toxic acetylenic alcohols.

In one embodiment of the method, the metal surface is contacted with the coating composition by including the coating composition in an aqueous acid solution injected into a wellbore to cleanup the wellbore and/or increase the permeability of a subterranean formation associated therewith. In this embodiment, the liquid carrier of the coating composition is the aqueous acid solution.

It is, therefore, a principal object of the present invention to provide a method and composition for forming a protective coating on metal surfaces to effectively inhibit the corrosive effects of various oxidative environments in contact with the surfaces.

Numerous other objects, features and advantages of the present invention will be readily apparent to those skilled in the art upon a reading of the following disclosure including the examples provided therewith.

DESCRIPTION OF THE PREFERRED EMBODIMENTS

The present invention includes a method of producing a protective coating on a metal surface to inhibit corrosion of the surface caused by an oxidative environment in contact therewith, and a coating composition for use in the method.

The inventive method comprises the step of contacting the metal surface with the inventive coating composition at a temperature and for a period of time sufficient to form a protective coating of at least a portion of the components of the coating composition on the metal surface. Any metal surface associated with an oxidative environment can be protected in accordance with the invention including surfaces comprised of ferrous metals, low alloy metals (e.g., N-80 grade), stainless steel (e.g., 13 Cr), copper alloys, brass, nickel alloys, duplex stainless steel alloys and the like. For example, the invention can be used to protect the external and internal metal surfaces of tubular goods, mixing tanks, pumps, conduits and other equipment used in association with processes for producing or enhancing the production of oil and/or gas from a subterranean formation. The invention is particularly applicable to protection of ferrous metals.

Examples of oxidative environments associated with metal surfaces to which the invention applies include environments associated with acids such as hydrochloric acid, nitrous acid and sulfuric acid, environments having a high level of humidity, and environments associated with chloride or bromide ions, carbon dioxide and hydrogen sulfide. The protective coating formed on metal surfaces in accordance with the invention inhibits the corrosive effects on the surfaces (e.g., loss of metal, pitting) caused by such environments.

The inventive coating composition has a pH below 7 and includes an aqueous liquid carrier and a corrosion inhibiting combination of a specific condensation product and at least one antimony compound(s) dissolved in the liquid carrier. As discussed below, the coating composition must have a pH below 7 and include the specific condensation product in order for the antimony compound to be activated to enhance the degree of inhibition of corrosion achieved.

The pH of the coating composition can range from 0 to below 7. Preferably, the pH of the coating composition is in the range of from about 0 to about 4, more preferably in the range of from about 0 to about 1. A better protective coating is formed when the pH of the composition is about 4 or below. The pH of the coating composition can be determined by the type of aqueous liquid carrier used therein.

The aqueous liquid carrier of the coating composition can be any aqueous solution which does not adversely react with the other components of the composition. In order for the coating composition to have a pH below 7, the liquid carrier is preferably an aqueous acid solution, i.e., an aqueous solution having a pH below 7. The pH of the coating composition generally approximately corresponds to the pH of the liquid carrier used. The aqueous liquid carrier is more preferably an aqueous acid solution comprising water and one or more mineral acids, most preferably water and hydrochloric acid.

Regardless of the type or pH of the aqueous liquid carrier, the pH of the coating composition can be adjusted by the addition of one or more acids and bases thereto. Acids suitable for use in forming the liquid carrier and for addition to the coating composition to adjust the pH thereof include inorganic acids such as hydrochloric acid, organic acids such as acetic acid, formic acid and glycolic acid, and mixtures thereof. If it is desired for the coating composition to inhibit the oxidative effects of hydrochloric acid, it must include hydrochloric acid in an amount of at least 2% by weight based on the weight of the aqueous liquid carrier.

The specific condensation product and the antimony compound(s) forming the corrosion inhibiting combination of the inventive coating composition synergistically function together to inhibit corrosion of the metal surface caused by various oxidative environments in contact therewith. The condensation product is prepared by reacting at least four reaction constituents together in the presence of from about 0.8 to about 1.2 equivalents of an aqueous mineral acid catalyst at a temperature in the range of from about 140 to about 250 F. for from about 4 to about 48 hours. The reaction constituents include:

(a) about one equivalent of a group (i) constituent having at least one reactive hydrogen atom attached to a carbon atom, a nitrogen atom or an oxygen atom and having no groups reactive under the conditions of reaction other than the one or more hydrogen atoms attached to the carbon, nitrogen or oxygen atom, the group (i) constituent including at least one member selected from the group consisting of amines, amides, thioamides, aldehydes, nitrogen heterocycles, ketones, phenols, acetylenic alcohols, carboxylic acid, esters of carboxylic acids, and substituted derivatives thereof;

(b) from about 0.6 to about 10 equivalents of a group (ii) constituent, the group (ii) constituent including a carbonyl group and having at least one hydrogen atom on the carbon atom adjacent to the carbonyl group;

(c) from about 0.5 to about 10 equivalents of a group (iii) constituent, the group (iii) constituent being an aldehyde; and (d) from about 0.10 to about 10 equivalents of a group (iv) constituent, the group (iv) constituent being selected from a fatty compound having from 5 to 60 carbon atoms, an alkyl nitrogen heterocycle having at least one alkyl group having from 1 to 18 carbon atoms and having 3 to 9 carbon atoms in the heterocyclic ring structure, and admixtures thereof.

The group (i) constituent used in preparing the condensation product preferably has at least one reactive hydrogen atom attached to a carbon atom or a nitrogen atom and has no groups reactive under the conditions of reaction other than the one or more hydrogen atoms attached to the carbon or nitrogen atom. Examples of active hydrogen compounds useful as or in connection with the group (i) constituent used in preparing the condensation product include organic ammonia derivatives having at least one hydrogen atom attached to a nitrogen atom such as, for example, primary and secondary amines, diamines, amides, ureas, thioureas, ammonia and ammonium salts, alicyclic amines, heterocyclic amines, aromatic amines and the like which contain no group reactive under the conditions of the reaction other than hydrogen attached to nitrogen; fully substituted amines in which at least one hydrogen atom adjacent to the amine is activated by the presence of the amine; aldehydes; ketones; phenols; acetylenic alcohols; and substituted derivatives thereof.

Other active hydrogen compounds that are effective include normal alkylamines having from 1 to 20 or more carbon atoms in the alkyl substituent such as, for example, methylamine, ethylamine, propylamine, butylamine, pentylamine, hexylamine, heptylamine, octylamine, nonylamine, decylamine, undecylamine, dodecylamine, tridecylamine, tetradecylamine, pentadecylamine, hexadecylamine, heptadecylamine, octadecylamine, nonyldecylamine, eicosylamine, and mixtures thereof; isoalkyl and tertiaryalkylamines having up to 20 carbon atoms in the alkyl substituent such as, for example, isopropylamine, isobutylamine, isoamylamine, and the like, tertiarybutylamine, tertiaryamylamine and the like; dialkylamines having from 1 to 20 alkyl groups in the alkyl substituent such as, for example, dimethylamine, diethylamine, dipropylamine, dibutylamine, diamylamine, dihexylamine, diheptylamine, dioctylamine, didecylamine, dioctadecylamine, and the like; diiso amines; and mixtures thereof. Diamines useful as or in connection with the group (i) constituent include diamines having from 1 to 20 carbon atoms in the alkyl portions thereof such as methylenediamine, ethylenediamine, propylenediamine, butylenediamine, diaminopentane (pentylenediamine), diaminohexane (hexylenediamine) and the like.

Additional active hydrogen compounds useful as or in connection with the group (i) constituent used in preparing the condensation product include ammonia, urea, thiourea, 1-acetyl-2-thiourea, 1,3-di-(Rosin Amine D) thiourea, 1,3-dibutylthiourea and the like, acetamide, N-1-napthylacetamide, oxamide, adipamide, propionamide, thioacetamide, malonamide, formamide, alpha-cyanoacetamide, succinimide, n-butyramide, dimethylacetamide, N-methyl-acetamide, n-butyramide, dimethyl-acetamide, N-methyl-acetamide, n-butyloxamate, hexanamide, phthalimide, n-valer-amide, isobutyramide, Armid 12 (95 percent dodecanamide, 4 percent tetradecanamide, 1 percent decanamide), N,N'-dibenzyldithiooxamide, dithiooxamide, Armid C (amide of coco fatty acids), 1-napthaleneacetamide, Armid O (91 percent oleamide, 6 percent stearylamide, 3 percent linolamide), N,N'-dimethylthiooxamide, acetanilide, Armid HT (75 percent stearylamide, 22 percent palmitamide, 3 percent oleamide), nonanamide, N,N'dicyclohexyldithiooxamide, benzamide, B-isothioureidopropionic acid, N,N'bis(hydroxymethyl)-dithiooxamide, and the like, 2-methylpiperazine, morpholine, pyrrolidine, 2-aminoethylpiperazine, and the like, 2-naphthylamine, benzylamine, 2-aminopyridine, aniline and the like, 1,3-diphenyltriazene, and the like, ammonium chloride, monobasic ammonium phosphate, ammonium acetate, ammonium thiocyanate, ammonium oxalate, dibasic sodium ammonium phosphate and the like. Fully substituted amines such as tetraethyl quaternary ammonium chloride and dimethyl dicoco quaternary ammonium chloride also can be utilized as sources of active hydrogen in accordance with the invention.

Preferably, the active hydrogen compound or compounds forming the group (i) constituent used in preparing the condensation product are selected from the group consisting of amides, thioamides, aldehydes and ketones. More preferably, the active hydrogen compound or compounds forming the group (i) constituent are selected from the group consisting of amides and thioamides. Most preferably, the group (i) constituent used in preparing the condensation product is a thioamide.

Examples of carbonyl compounds useful as or in connection with the group (ii) constituent used in preparing the condensation product of the corrosion inhibiting combination of the inventive coating composition include aliphatic and aryl substituted aliphatic aldehydes, aliphatic and aryl substituted aliphatic ketones and mixtures thereof such as, for example, acetophenone, mesityl oxide, 1-acetonaphthone, 1 part acetophenone plus 1 part acetone, p-methoxyacetophenone, propiophenone, p-chloroacetophenone, isophorone, tetrolophenone, 2,4-pentanedione, Ketosol (75 percent phenethyl alcohol, 25 percent acetophenone), 2-acetylcyclohexanone, 2-acetonaphthone, 2-thienylketone, methyl isobutylketone, n-butyrophenone, acetone, 3,4-dihydro-1-(2H)-naphthalenone, 2-heptanone, diacetone alcohol, undecanone-2, and the like. Preferably, the carbonyl compound or compounds forming the group (ii) constituent used in preparing the condensation product are selected from the group consisting of aromatic substituted aldehydes, aromatic substituted ketones and aliphatic ketones, more preferably from the group consisting of aromatic substituted aldehydes and aromatic substituted ketones. Most preferably, the group (ii) constituent is an aromatic substituted ketone.

Aldehydes useful as or in connection with the group (iii) constituent used in preparing the condensation product include aliphatic aldehydes having from 1 to 16 or more carbon atoms and aromatic aldehydes having no functional groups which are reactive under the reaction conditions other than aldehydes. Such aldehydes include formaldehyde, benzaldehyde, heptanal, propanol, hexanal, octanal, decanal, hexadecanal, cinnamaldehyde and the like. Other aldehydes useful as or in connection with the group (iii) constituent include any aldehyde generating material under the conditions of the reaction such as paraformaldelyde, urotropin new, paraldehyde, acetals, hemiacetals, sulfite addition products and the like. Preferably, the aldehyde(s) forming the-group (iii) constituent used in preparing the condensation product are aliphatic aldehydes. Most preferably, the group (iii) constituent is formaldehyde.

Fatty compounds useful as or in connection with the group (iv) constituent used in preparing the condensation product include alkyl carboxylic acids, amines, amides and alcohols having from about 5 to about 60 carbon atoms and olefinic carboxylic acids having from about 5 to about 60 carbon atoms and having one or more unsaturated sites along the chain. In addition, various alkylene oxide adducts of the above fatty compounds have been found effective. Thus, the group (iv) constituent can be or include rendered animal fat, octanoic acid, myristic acid, pelargonic acid, abietic acid, lauric acid, oleic acid, caprylic acid, tall oil acid, coco fatty acids+15 moles ethylene oxide, oleic acid+15 moles ethylene oxide, 70 percent rosin fatty acids+15 moles ethylene oxide, tall oil+4 moles propylene oxide+8 moles ethylene oxide, tall oil+6 moles propylene oxide+12 moles ethylene oxide, tall oxide+4 moles propylene oxide+12 moles ethylene oxide, tall oil+4 moles propylene oxide+10 moles ethylene oxide, tall oil+6 moles propylene oxide+8 moles ethylene oxide, tall oil+6 moles propylene oxide+10 moles ethylene oxide, and the like. As used herein and in the appended claims, the term "fatty" refers to the length of the carbon chain, which should consist of at least about 5 carbon atoms. The degree of saturation or unsaturation of the fatty compound is unimportant so long as any substituents present do not cause unwanted side reactions.

Examples of alkyl nitrogen heterocycles useful as or in connection with the group (iv) constituent used in preparing the condensation product include compounds such as 2-methyl pyridine, 4-methyl pyridine, 2-methyl quinoline, 4-methyl quinoline, alkyl pyridine and the like. Alkyl nitrogen heterocycles preferred as or in connection with the group (iv) constituent include those that are 2 or 4 alkyl substituted.

Preferably, the compound or compounds forming the group (iv) constituent used in preparing the condensation product are selected from the group consisting of carboxylic acids, ethoxylated carboxylic acids, amides and ethoxylated amides, more preferably from the group consisting of carboxylic acids, and ethoxylated carboxylic acids. Most preferably, the group (iv) constituent is a carboxylic acid.

The aqueous mineral acid catalyst used in preparing the condensation product of the corrosion inhibiting combination of the inventive composition must be of sufficient strength to form the condensation product. Examples of suitable acid catalysts include hydrochloric acid, sulfuric acid, methane sulfonic acid, phosphoric acid and the like. The acid catalyst can comprise substantially any acid which is a strong proton donor. The specific quantity of acid utilized can vary over wide ranges. Any quantity can be utilized that does not result in the occurrence of undesirable side reactions under the reaction conditions.

The temperature at which the various reaction constituents are reacted together to form the condensation product is preferably in the range of from about 80 F. to about 240 F. Although the duration of the reaction may significantly exceed 48 hours without any adverse affects, such extensive periods are not generally required to yield usable products. Upon completion of the reaction, additional fatty compounds and/or alkyl nitrogen heterocycle compounds of the group (iv) constituent as set out above can be added to the reacted components with stirring to bring the ratio of the group (iv) constituent to a level of from about 2 to about 20 equivalents. As used herein and in the appended claims, the term "equivalent" means the number of moles of the referenced compound or compounds that are present times the number of reactive sites on the compound or compounds under the conditions of the reaction.

Additional compounds which can be substituted for the various reaction constituents and other components used in preparing and other information regarding the condensation product of the corrosion inhibiting combination of the inventive composition are disclosed in U.S. Pat. Nos. 3,630,933, 3,932,296, 3,077,454, 2,758,970, 2,489,668, 4,493,775, 3,634,270, and 3,094,490, and European patent application nos. 0 276 879 A1 and 0 212 752 A1, the entire disclosures of which are fully incorporated by reference herein.

The antimony compound or compounds used in the corrosion inhibiting combination of the inventive coating composition can be any antimony compound or compounds capable of activation by the condensation product of the corrosion inhibiting combination to enhance the degree of inhibition of corrosion of the metal surface achieved by the condensation product. Antimony compounds alone do not significantly inhibit the corrosive effects of oxidative environments on metal surfaces. When certain antimony compounds are combined with the condensation product, however, they are activated by the condensation product to substantially enhance the inhibition of corrosion achieved by the condensation product. As shown by the examples below, one or more antimony compounds are necessary for an effective coating to be formed on metal surfaces. As used herein and in the appended claims, an antimony compound that is "activated" or "capable of activation" by the condensation product is an antimony compound that is made active or more active by the condensation product in inhibiting the corrosive effect(s) of oxidative environment(s) on metal surfaces in contact therewith beyond the inhibition of corrosive effect(s) achieved by the condensation product alone. The antimony compound or compounds used in the corrosion inhibiting combination of the coating composition are preferably soluble in the aqueous liquid carrier, at least under the conditions in which the method is actually carried out.

The exact mechanism by which the condensation product activates the antimony compound(s) is not known at this time. It is believed, however, that the condensation product mitigates corrosion and inhibits the formation of hydrogen gas from hydrogen ions generated by reaction of the coating composition with the metal surface. This allows antimony ions provided by the antimony compound(s) to diffuse to the metal surface where they are reduced in the vicinity thereof by hydrogen ions and slowly form a uniform, tight, non-porous coating on the surface. In the absence of the condensation product, the coating composition reacts too quickly with the metal surface causing a relatively high rate of diffusion of iron away from the metal surface. Hydrogen gas is formed from hydrogen ions and also diffuses at a relatively high rate away from the metal surface. The diffusion of iron and hydrogen gas away from the metal surface prevents antimony ions from diffusing to the surface and being reduced by hydrogen ions in the vicinity thereof. As a result, any coating formed is porous and spongy at best. It is necessary for the coating composition to have a pH below 7 in order to obtain hydrogen ions which are necessary to reduce the antimony ions.

Examples of antimony compounds that can be employed include antimony oxide compounds such as antimony trioxide, antimony tetraoxide and antimony pentoxide, antimony chloride compounds such as antimony trichloride and antimony pentachloride, antimony fluoride compounds such as antimony trifluoride and antimony pentafluoride, antimony tartrate, antimony citrate, alkali metal salts of antimony tartrate and antimony citrate, potassium pyroantimonate and other alkali metal salts thereof, antimony adducts of ethylene glycol, and antimony compounds present in solutions containing (i) ethylene glycol, (ii) water and (iii) the oxidized product of hydrogen peroxide and antimony trioxide or any other antimony compound that provides trivalent antimony ions. Preferably, the antimony compound or compounds employed are selected from the group consisting of antimony oxides, antimony chlorides and antimony compounds present in solutions containing (i) ethylene glycol, (ii) water and (iii) the oxidized product of hydrogen peroxide and antimony trioxide or any other antimony compound that provides trivalent antimony ions. Most preferably, the antimony compound or compounds employed are antimony oxides.

In certain applications, it is advantageous to combine additional compounds with the aqueous liquid carrier and corrosion inhibiting combination of the condensation product and antimony compound(s) of the inventive coating composition. Optional components that can be employed include quaternary ammonium compounds, formic acid generating compounds, sources of copper ions, sources of iodide, aromatic hydrocarbons having high oil wetting characteristics, solvents, surfactants and mixtures thereof. These additives broaden the utility of the coating composition, enhance the effectiveness of the composition and/or facilitate use thereof.

Quaternary ammonium compounds increase the degree of inhibition of corrosion achieved by the coating composition in certain applications. Examples of quaternary ammonium compounds that can be added to the inventive coating composition include aromatic nitrogen compounds such as alkylpyridine-N-methyl chloride, alkylpyridine-N-benzyl chloride, alkylquinoline-N-benzyl chloride, alkylisoquinoline quaternaries, benzoquinoline quaternaries, chloromethylnaphthalene quaternaries, admixtures of the above compounds and the like. The alkyl group associated with the pyridine compounds can contain from 0 to about 6 carbon atoms. The alkyl group associated with the quinoline compounds can contain from 0 to about 8 carbon atoms.

Aromatic hydrocarbons having high oil wetting characteristics also increase the degree of inhibition of corrosion achieved by the inventive coating composition in certain applications. Substantially any aromatic hydrocarbon compound that exhibits high oil-wetting characteristics can be employed. Examples include xylenes, saturated biphenyl-xylene admixtures, heavy aromatic naphtha, tetralene, tetrahydroquinoline, tetrahydronaphthalene and the like.

A solvent such as an alkyl alcohol, glycol or mixtures thereof can also be added to the inventive coating composition to assist in maintaining the components of the composition as a homogeneous admixture. Examples of alkyl alcohols and glycols that can be used include methyl alcohol, ethyl alcohol, propyl alcohol, isopropyl alcohol, butyl alcohol, pentyl alcohol, hexyl alcohol, heptyl alcohol, octyl alcohol, ethylene glycol, propylene glycol and higher liquid members of the group of aliphatic alcohols. Preferably, the alkyl alcohol and/or glycol is employed in an amount no greater than is sufficient to maintain the components as a homogeneous admixture as excess quantities have no demonstrable effect on the effectiveness of the coating composition. The alkyl alcohol and/or glycol preferably comprises less than about fifteen percent by volume of the composition to avoid unnecessary dilution of the composition.

One or more surfactants can also be included in the inventive coating composition in an amount sufficient to facilitate dispersion of the corrosion inhibiting combination of the condensation product and antimony compound(s) and other components employed throughout the aqueous liquid carrier. Due to their inert nature, nonionic surfactants are preferred. Examples of nonionic surfactants that can be used include ethoxylated oleates, tall oils and ethoxylated fatty acids. Ethylene oxide adducts of octyl phenol, nonylphenol, tridecyl phenol and the like having about 8 to 20 moles of ethylene oxide are preferred. The surfactant(s) preferably comprise less than about 20 percent by volume of the coating composition to avoid unnecessary dilution of the coating composition.

The inventive method can be carried out by first admixing the aqueous liquid carrier with the condensation product and the antimony compound(s) forming the corrosion inhibiting combination of the composition. The condensation product is preferably admixed with the liquid carrier prior to addition of the antimony compound(s) to the liquid carrier. The condensation product and antimony compound(s) can be pre-admixed if desired. The components of the coating composition should be thoroughly admixed together.

The amount of the corrosion inhibiting combination of the condensation product and antimony compound(s) admixed with the liquid carrier can vary over a substantial range depending upon the degree of inhibition of corrosion desired for the particular application, the nature of the liquid carrier, the temperature at which the method is carried out and other factors known to those skilled in the art. Preferably, the corrosion inhibiting combination of the condensation product and the antimony compound(s) is present in the liquid carrier in an amount in the range of from about 1 to about 20 gallons, more preferably in the range of from about 5 to about 20 gallons, per 1000 gallons of the liquid carrier. The coating composition can be prepared in any mixing tank equipped with suitable mixing means known to those skilled in the art. As stated above, if necessary, one or more acids and/or bases can be added to the coating composition to adjust the pH to the desired range.

The condensation product is preferably present in the coating composition in an amount in the range of from about 3% to about 75%, more preferably from about 10% to about 30%, by weight based on the total weight of the coating composition. The antimony compound(s) are preferably present in the coating composition in an amount sufficient to impart a molar concentration of antimony ions in the coating composition of from about 0.0001 to about 0.1 molar, preferably from about 0.0007 to about 0.04 molar. Most preferably, the antimony compound(s) are present in the coating composition in an amount sufficient to impart a molar concentration of antimony ions in the coating composition of from about 0.001 to about 0.04 molar. Although a quantity of antimony ions larger than 0.1 molar can be utilized, excessive amounts have no demonstrable effect except at highly elevated temperatures.

When a quaternary aromatic ammonium compound is employed, it is preferably present in the coating composition in an amount in the range of from about 6 to about 80% by weight based on the total weight of the coating composition. When an aromatic hydrocarbon compound is employed, it is preferably present in the coating composition in an amount the range of from about 0.5 to about 40% by weight based on the total weight of the coating composition. When one or more surfactants are employed for facilitating dispersion of the corrosion inhibiting combination of the condensation product and antimony compound(s) and other compounds employed throughout the aqueous liquid carrier, they are preferably present in the coating composition in an amount in the range of from about 1 to about 20% by weight based on the total weight of the coating composition.

The metal surface to be protected in accordance with the inventive method can be contacted with the inventive coating composition by any manner that results in the formation of a surface deposit of the composition on the surface. For example, the surface can be contacted with the composition by immersing the surface in the composition or by flowing the composition across the surface. Upon contacting the metal surface, the coating composition forms a surface deposit thereon comprised of at least a portion of the components of the coating composition.

The metal surface is preferably contacted with the coating composition for a time ranging from about 15 minutes to over several hours. At elevated contacting temperatures, a satisfactory protective coating is generally formed by immersion of the metal surface in the coating composition for a time ranging from about 1 to about 4 hours. When the metal surface is immersed in the coating composition in a mixing tank or some other means on the surface, agitation of the composition by conventional means is desirable to reduce the total time required for a satisfactory protective coating to form.

The temperature at which the metal surface is contacted with the coating composition can range from about ambient temperature to about 500 F. Preferably, the temperature at which the metal surface is contacted with the coating composition is in the range of from about 240 F. to about 450 F. In some applications, it is desirable to maintain the pH of the coating composition and the temperature at which the metal surface is contacted with the coating composition in the preferred ranges during the time the metal surface is contacted with the coating composition.

As an example, the inventive method can be utilized to protect metal surfaces of a cased wellbore during treatment of a subterranean formation with an acidic solution to provide residual oxidation protection to the casing subsequent to the treatment. In such an application, the aqueous liquid carrier used in the inventive coating composition can be the acidizing solution (e.g., a 15 wt. % hydrochloric acid solution). The acidic solution containing the coating composition is introduced into the wellbore, pumped therethrough and introduced into the subterranean formation. The inventive coating composition forms a tight, uniform, non-porous coating on the metal surfaces of the casing which protects the casing from corrosion by the acid during the acid treatment. The injected acidic acid solution dissolves soluble material within the subterranean formation whereby at least a portion of the acidic content of the solution is neutralized. The partially neutralized acidic solution is then conducted back to the wellbore for removal at the surface. The protective coating protects the casing from the various oxidative environments created by this process. After the acidizing treatment, the wellbore may be placed in production to produce, for example, a mixture of conate water, carbon dioxide, hydrogen sulfide and oil from the subterranean formation. The coating composition protects the casing from the various oxidative environments caused by these production materials.

Thus, the inventive method and coating composition can be used to provide a uniform, non-porous, non-corrosive protective coating on a metal surface to inhibit or prevent the corrosive effects of various oxidative environments on the metal surface. The specific condensation product and antimony compound(s) forming the corrosion inhibiting combination of the composition synergistically function together to substantially reduce the corrosive effects on the metal surface. The antimony compounds allow the protective coating to form on the metal surface. The coating composition adheres to the metal surface for a relatively long period of time (e.g., 12 months in some applications) and protects the surface against attack by a variety of oxidative environments.

The inventive coating composition is capable of protecting various metal surfaces such as ferrous metal surfaces in contact with hostile oxidative environments such as aqueous acidic solutions at temperatures from ambient to about 500 F. As shown by the examples below, the coating composition also protects such metal surfaces for extended periods of time even when the surfaces are exposed to other oxidative environments. For example, the coating composition protects a metal surface against the oxidative effects of moist air having humidity levels in excess of 40% for extended periods of time.

The following examples are provided to further illustrate the effectiveness of the inventive method and composition.

EXAMPLE I

Tests were carried out to determine the effectiveness of the inventive method and composition in producing a protective coating on a metal surface to inhibit the corrosive effects on the surface of oxidative environments in contact therewith.

The Compositions Tested

First, two inhibitor compositions were prepared in accordance with the present invention.

Inhibitor composition A was a condensation product prepared by reacting (a) 0.15 moles (1.0 equivalent) of thiourea, (b) 0.3 moles (2.0 equivalents) of acetophenone, (c) 0.66 moles (4.4 equivalents) of formaldehyde, and (d) 0.2 moles (1.3 equivalents) of oleic acid in the presence of about 0.15 moles (1.0 equivalent) of hydrochloric acid. The reaction was carried out in a reaction vessel in which the reaction components were stirred and heated to and maintained under reflux conditions at a temperature of about 210 F. for about 16 hours. The condensation product formed a nonaqueous layer in the reaction vessel which was separated from the residue in the vessel upon cooling of the reaction mixture. Approximately 25 grams of nonylphenol ethoxylated with about 20 moles of ethylene oxide, a nonionic surfactant, were then added to the condensation product.

Inhibitor composition B was a condensation product formed of the same components and in the same manner as the condensation product forming inhibitor composition A. In inhibitor composition B, however, about 115 grams of a solution consisting of about 60% by weight methylnaphthylquinolinium chloride, a quaternary aromatic ammonium compound, were added to the condensation product. Like inhibitor composition A, inhibitor composition B also included about 25 grams of nonylphenol ethoxylated with about 20 moles of ethylene oxide, a nonionic surfactant.

Next, various test compositions were prepared by adding inhibitor composition A or inhibitor composition B and in some cases antimony compound(s) to various aqueous hydrochloric acid solutions. The aqueous hydrochloric acid solutions were prepared by adding sufficient quantities of concentrated hydrochloric acid and, in some, sodium hydroxide to water to achieve the desired concentration and/or pH. One of either inhibitor composition A or inhibitor composition B was added to each aqueous acid solution in an amount sufficient to impart 2% by volume of the inhibitor composition to the solution. A sufficient amount of antimony compound(s) were then dissolved in some of the solutions to impart a molar concentration of antimony ions in the solutions of about 0.040. The antimony compound(s) utilized were provided by a solution consisting of ethylene glycol, water and the oxidized product of hydrogen peroxide and antimony trioxide.

The Tests

A weighed sample coupon consisting of type "N-80" steel obtained from nominal wall 2⅜ API grade oil field tubing was suspended in each test composition. Each composition was then heated to and maintained at 400 F. for 4 hours under a 600 psig over pressure of an inert heat transfer fluid, kerosene.

After the 4 hour period, the coupons were removed from the test compositions, rinsed in acetone and water and visually inspected to determine whether a protective coating had formed thereon. The coupons were then placed in a vessel having a loose fitting lid in which an oxidizing atmosphere having a 40 to 90% humidity and a temperature of 60 to 78 F. was maintained for over thirty days. After the thirty day plus period, the coupons were removed from the vessel and inspected for visual signs of oxidation.

The Results of the Tests

The results of the tests are shown by Table I below.

TABLE I

Formation of Coating on Metal Coupons and Subsequent Protection Provided Thereby

| Test Composition | Inhibitor Composition | Liquid Carrier | Antimony | Formation Of Protective Coating* | Degree Of Oxidation** |
|---|---|---|---|---|---|
| 1 | A | 15% HCl*** | No | No | Extensive |
| 2 | A | pH 4 (HCl)**** | No | No | Extensive |
| 3 | A | 15% HCl*** | Yes | Yes | None |
| 4 | A | pH 4 (HCl)**** | Yes | Yes | None |
| 5 | B | 15% HCl*** | No | No | Extensive |
| 6 | B | pH 4 (HCl)**** | No | No | Extensive |
| 7 | B | 15% HCl*** | Yes | Yes | None |
| 8 | B | pH 4 (HCl)**** | Yes | Yes | None |

*The metal coupon suspended in each test composition was visually inspected after the composition was heated at 400 F. for 4 hours under 600 psig to see if a protective coating formed thereon.
**Each coupon was inspected for visual signs of oxidation after being maintained in an oxidizing atmosphere having a humidity level of 40 to 90% and a temperature of 60 to 78 F. for over thirty days.
***The aqueous acid solution used in these test compositions was a 15% by weight hydrochloric acid aqueous solution prepared by combining an appropriate amount of concentrated hydrochloric acid with water.
****The aqueous acid solution used in these test compositions was an aqueous hydrochloric solution having a pH of about 4 formed by adding an appropriate amount of concentrate hydrochloric acid to water to form a solution having a pH of about 0 and then increasing the pH of the solution to about 4 by adding an appropriate amount of sodium hydroxide thereto.

Table I clearly illustrates the effectiveness of the inventive method and composition in forming a protective coating on metal surfaces and the necessity of antimony in connection therewith. The results also show that the protective coating formed by the inventive method and composition protects metal surfaces from corrosion over an extended period of time.

EXAMPLE II

The effectiveness of the inventive composition in forming a protective coating on and in inhibiting corrosion of other types of metal surfaces was tested.

The Compositions Tested

The test compositions employed in these tests were the same and prepared in the exact manner as the test compositions employed in the tests described in Example I, except the aqueous acid solution used in some of the compositions was different and antimony was included in each composition (at 0.040 molar).

The Tests

Weighed sample coupons consisting of various types of metals were suspended in the test compositions. The test compositions were then heated to and maintained at either 400 F. or 350 F. under a 600 psig over pressure of an inert heat transfer fluid, kerosene, for 4 hours. The coupons were removed from the test compositions, rinsed in acetone and water and visually inspected to determine whether a protective coating had formed thereon.

The Results of the Tests

The results of the test are shown in Table II below.

TABLE II

Protection of Various Types of Metal Surfaces

| Test Composition | Inhibitor Composition | Liquid Carrier | Coupon* | Coating** |
|---|---|---|---|---|
| 1 | A | 15% HCl*** | C-276 | Yes |
| 2 | B | 15% HCl*** | C-276 | Yes |
| 3 | A | 12-3 HCl—HF**** | C-276 | Yes |
| 4 | B | 12-3 HCl—HF**** | C-276 | Yes |
| 5 | A | 15% HCl*** | Monel K-500 | Yes |
| 6 | B | 15% HCl*** | Monel K-500 | Yes |
| 7 | A | 12-3 HCl—HF**** | Monel K-500 | Yes |
| 8 | B | 12-3 HCl—HF**** | Monel K-500 | Yes |
| 9 | A | 15% HCl*** | Incoloy 925 | Yes |
| 10 | B | 15% HCl*** | Incoloy 925 | Yes |
| 11 | A | 12-3 HCl—HF**** | Incoloy 925 | Yes |
| 12 | B | 12-3 HCl—HF**** | Incoloy 925 | Yes |
| 13 | A | 15% HCl*** | 13Cr | Yes |
| 14 | B | 15% HCl*** | 13Cr | Yes |
| 15 | A | 12-3 HCl—HF**** | 13Cr | Yes |
| 16 | B | 12-3 HCl—HF**** | 13Cr | Yes |
| 17 | A | 15% HCl*** | 22% Cr Duplex | Yes |
| 18 | B | 15% HCl*** | 22% Cr Duplex | Yes |
| 19 | A | 12-3 HCl—HF**** | 22% Cr Duplex | Yes |

TABLE II-continued

Protection of Various Types of Metal Surfaces

| Test Composition | Inhibitor Composition | Liquid Carrier | Coupon* | Coating** |
|---|---|---|---|---|
| 20 | B | 12-3 HCl—HF**** | 22% Cr Duplex | Yes |

\* — C-276 (Hastelloy C-276) is a nickel alloy.
— Monel K-500 is a copper/nickel alloy.
— Incoloy 925 is a chromium/nickel alloy.
— 13Cr is 13% chromium martensitic steel.
— "22% Cr Duplex" is a chromium duplex stainless steel.
\*\*The metal coupon suspended in each test composition was visually inspected after the composition was heated at 400 F. or 350 F. for 4 hours under 600 psig to see if a protective coating formed thereon.
\*\*\*The aqueous acid solution used in these test compositions was a 15% by weight hydrochloric acid aqueous solution prepared by combining an appropriate amount of concentrated hydrochloric acid with water.
\*\*\*\*The aqueous acid solution used in these test compositions was an aqueous acidic solution containing 12% by wt. hydrochloric acid and 3% by wt. hydrofluoric acid and prepared by combining appropriate amounts of concentrated hydrochloric acid and ammonium bifluoride with water.

Table II shows that the inventive method and composition effectively forms a protective coating on a variety of metal surfaces when contacted therewith.

EXAMPLE III

The effectiveness of the inventive method and composition in forming protective coatings on a metal surface at various pH levels was tested.

The Compositions Tested

First, three aqueous solutions having pH values of about 0, about 3 and about 7 were prepared. The aqueous solution having a pH of about 0 was prepared by adding an appropriate amount of concentrated hydrochloric acid to water. The aqueous solution having a pH of about 7 was prepared by adding an appropriate amount of sodium hydroxide to a mixture of concentrated hydrochloric acid and water initially having a pH of about 0. The aqueous fluid having a pH of about 3 was prepared by adding an appropriate amount of acetic acid to water.

Test compositions were then formed by adding inhibitor composition A or inhibitor composition B as described in Example I to the aqueous solutions in an amount sufficient to impart about 2% by volume of the inhibitor composition to the aqueous solution. Six (6) test compositions were formed with each type of inhibitor composition being employed with each type of aqueous solution (i.e., two test compositions were formed of each type of aqueous solution, one of each pair having inhibitor composition A and the other of each pair having inhibitor composition B). Antimony compound(s) were then added to each test composition in an amount sufficient to impart a molar concentration of antimony ions in the compositions of about 0.040. The antimony compound(s) used were provided by a solution consisting of ethylene glycol, water and the oxidized products of hydrogen peroxide and antimony trioxide.

The Tests

A type "N-80" steel coupon as described in Example I was placed in each test composition and heated to and maintained at a temperature of about 350 F. under 500 psig over pressure of an inert transfer fluid, kerosene, for 4 hours. After the 4 hour period, each coupon was removed from the test composition, rinsed in acetone and water and visually examined for the presence of a protective coating.

The Results of the Tests

The results of the tests are shown in Table III below.

TABLE III

Effectiveness of Inventive Method And Composition in Forming Protective Coatings at Various pH Levels

| Tent Composition | Inhibitor Composition | pH of Liquid Carrier | Formation of Protective Coating* |
|---|---|---|---|
| 1 | A | 0 | Yes |
| 2 | B | 0 | Yes |
| 3 | A | 3 | Yes |
| 4 | B | 3 | Yes |
| 5 | A | 7 | Yes |
| 6 | B | 7 | Yes |

*The metal coupon suspended in each test composition was visually inspected after the composition was heated at 400 F. for 4 hours under 600 psig to see if a protective coating formed thereon.

Table III illustrates the wide pH range over which a protective coating is formed on metal surfaces in accordance with the present invention.

EXAMPLE IV

Tests were carried out to determine the cohesiveness of protective coatings formed in accordance with the inventive method and composition.

The Compositions Tested

First, test compositions were formed by adding inhibitor composition A or inhibitor composition B as described in Example I to aqueous solutions containing 7.5% by wt. hydrochloric acid formed by admixing appropriate amounts of concentrated hydrochloric acid with water. A sufficient amount of antimony compounds were then added to each test composition to impart a molar concentration of antimony ions in each composition of 0.040. The antimony compounds used were provided by a solution consisting of ethylene glycol, water and the oxidized products of hydrogen peroxide and antimony trioxide.

The Tests and Results Thereof

Several coupons formed of type "N-80" steel as described in Example I were placed in each test composition. The compositions were then heated to and maintained at a temperature of 400 F. under 600 psig over pressure of an inert heat transfer fluid, kerosene, for 4 hours. At the conclusion of the 4 hour period, the coupons were removed, rinsed in acetone and water and visually inspected to see if a protective coating had formed thereon. A protective coating had formed on each coupon.

Next, three aqueous acid solutions having pH levels of 2, 4 and 6, respectively, were prepared by adding appropriate amounts of concentrated hydrochloric acid to tap water. At least one "N-80" steel metal coupon coated with the inventive coating composition as described above was placed in each aqueous acid solution. Each solution was then heated to and maintained at 400 F. under 600 psig over pressure of an inert heat transfer fluid, kerosene, for 64 hours. After the 64 hour test period, the coupons were removed, rinsed with acetone and water and visually inspected to determine if the protective coating had remained thereon and, if so, whether or not the coating was protecting the metal surface of the coupon from corrosion. It was determined that each coupon still had a protective coating tightly adhering to its surface and had no apparent signs of corrosion.

Thus, the inventive method and composition produces an effective protective coating that tightly adheres to metal surfaces and protects the surfaces at various pH levels for extended periods of time.

EXAMPLE V

Additional tests were carried out to confirm the effectiveness of the inventive method and composition and, more specifically, to illustrate the synergistic effect of employing both a specific condensation product and an antimony compound in the composition.

The Compositions Tested

An aqueous solution containing 15% by weight hydrochloric acid was first prepared by adding an appropriate amount of concentrated hydrochloric acid to water. The aqueous solution was then divided into five test samples.

In the first test sample, a sufficient quantity of antimony compounds were dissolved in the solution to impart a 0.040 molar concentration of antimony therein. The antimony compounds used were provided by a solution consisting of ethylene glycol, water and the oxidized products of hydrogen peroxide and antimony trioxide.

In the second test sample, the inhibitor composition A, as described in Example I above, was added to the solution in an amount sufficient to impart 2% by volume of inhibitor composition A to the solution.

In the third sample, the inhibitor composition B, as described in Example I above, was added to the solution in an amount sufficient to impart 2% by volume of inhibitor composition B to the solution.

In the fourth test sample, sufficient amounts of the inhibitor composition A and antimony compounds, as described above, were added to the solution to impart 2% by volume of the inhibitor composition A and a 0.040 molar concentration of antimony ions to the solution.

Finally, in the fifth test sample, sufficient amounts of the inhibitor composition B and antimony compounds, as described above, were added to the solution to impart 2% by volume of the inhibitor composition B and a 0.040 molar concentration of antimony ions to the solution.

The Tests

A metal coupon formed of type "N-80" steel as described above was placed in each of the five test samples. The samples were heated to and maintained at 400 F. under 600 psig over pressure of an inert heat transfer fluid, kerosene, for 4 hours. After the 4 hour period, the coupons were removed, rinsed with acetone and water and visually inspected to see if a protective coating had formed thereon and if the coupons were corroded. The coupons were then put in a vessel having a loose fitting cap in which an oxidizing atmosphere having a 70 to 78 F. temperature and a 40 to 90% humidity level was maintained for over 30 days to determine if the coatings provided the coupons with residual protection against corrosion.

The Results of the Tests

The metal coupon from the first test sample, the acidic solution containing only antimony, did not have a protective coating and was extensively corroded after being placed in the sample and heated for 4 hours. When this coupon was exposed to the oxidative atmosphere, rust rapidly formed on its surface.

The metal coupons from the second and third test samples, the acidic solutions containing either the inhibitor composition A or the inhibitor composition B in the absence of antimony, did not have a protective coating thereon and were corroded to some extent, although not as extensively as the metal coupon from the first test sample, after being placed in the samples and heated for four hours. When these coupons were exposed to the oxidative atmosphere, rust rapidly formed on their surfaces.

Finally, the metal coupons from the fourth and fifth test samples, the acidic solutions containing both the inhibitor composition A or the inhibitor composition B and antimony, were found to have a protective coating on their surfaces and were relatively not corroded after being placed in the samples and heated for four hours. Rust did not appear to form on the surfaces of these coupons upon exposure to the oxidative atmosphere.

The preceding examples can be repeated with similar success by substituting the generically or specifically described steps and operating conditions of this invention for those used in the examples.

Although certain preferred embodiments of the invention have been described for illustrative purposes, it will be appreciated that various modifications and innovations of the inventive method and composition may be effected without departure from the basic principals which underlie the invention. Changes of this type are therefore deemed to lie within the spirit and scope of the invention except as may be necessarily limited by the inventive claims and reasonable equivalents thereof.

What is claimed is:

1. A method of coating antimony on a metal surface comprising:

contacting the metal surface with a composition substantially free of acetylenic alcohols and having a pH below 7 at a temperature and for a period of time sufficient to coat antimony on the metal surface, said composition including an aqueous liquid carrier, a condensation product and at least one antimony compound, said antimony compound being capable of activation by said condensation product, said condensation product being prepared by reacting at least four reaction constituents together in the presence of from about 0.8 to about 1.2 equivalents of an aqueous mineral acid catalyst at a temperature in the range of from about 140 to about 250 F. for in the range of from about 4 to about 48 hours, said reaction constituents including:

about one equivalent of a group (i) constituent having at least one reactive hydrogen atom and no groups reactive under the conditions of reaction other than hydrogen, said group (i) constituent including at least one member selected from the group consisting of amines, amides, thioamides, aldehydes, nitrogen heterocycles, ketones, phenols, acetylenic alcohols, carboxylic acids, and esters of carboxylic acids;

from about 0.6 to about 10 equivalents of a group (ii) constituent, said group (ii) constituent including a carbonyl group and having at least one hydrogen atom on the carbon atom adjacent to the carbonyl group;

from about 0.5 to about 10 equivalents of a group (iii) constituent, said group (iii) constituent being an aldehyde; and from about 0.10 to about 10 equivalents of a group (iv) constituent, said group (iv) constituent being selected from a fatty compound having from 5 to 60 carbon atoms, an alkyl nitrogen heterocycle having at least one alkyl group having from 1 to 18 carbon atoms and 3 to 9 carbon atoms in the heterocyclic ring structure and admixtures thereof, wherein each of said group (i) constituent, group (ii) constituent, group (iii) constituent and group (iv) constituent are different compounds or different mixtures of compounds, the method of claim 1 wherein said antimony compound is present in said composition in an amount sufficient to impart a molar concentration of antimony ions in said composition of from about 0.0001 to about 0.1.

2. The method of claim 1 wherein said antimony compound is selected from the group consisting of antimony oxides, antimony chlorides, antimony fluorides, antimony tartrate, antimony citrate, alkali metal salts of antimony tartrate and antimony citrate, alkali metal salts of pyroantimonate, antimony adducts of ethylene glycol and antimony compounds present in solutions containing (i) ethylene glycol, (ii) water and (iii) the oxidized product of hydrogen peroxide and an antimony compound that provides trivalent antimony ions.

3. The method of claim 1 wherein said antimony compound is an antimony compound present in a solution containing ethylene glycol, water and the oxidized product of hydrogen peroxide and antimony trioxide.

4. The method of claim 1 wherein said antimony compound is present in said composition in an amount sufficient to impart a molar concentration of antimony ions in said composition of from about 0.0001 to about 0.1.

5. The method of claim 1 wherein said antimony compound is present in said composition in an amount sufficient to impart a molar concentration of antimony ions in said composition of from about 0.0007 to about 0.04.

6. The method of claim 1 wherein said group (i) constituent is selected from the group consisting of amides, thioamides, aldehydes and ketones.

7. The method of claim 1 wherein said group (i) constituent is selected from the group consisting of amides and thioamides.

8. The method of claim 1 wherein said group (i) constituent is selected from the group consisting of amides, thioamides, aldehydes and ketones, said group (ii) constituent is selected from the group consisting of aromatic substituted aldehydes, aromatic substituted ketones and aliphatic ketones, said group (iii) constituent is an aliphatic aldehyde and said group (iv) constituent is selected from the group consisting of carboxylic acids, ethoxylated carboxylic acids, amides and ethoxylated amides.

9. The method of claim 1 wherein said group (i) constituent is thiourea, said group (ii) constituent is acetophenone, said group (iii) constituent is formaldehyde, said group (iv) constituent is oleic acid, and said aqueous mineral acid catalyst is hydrochloric acid.

10. The method of claim 1 wherein said condensation product is prepared in the presence of about 1.0 equivalent of hydrochloric acid and includes about 1.0 equivalent of thiourea, about 2.0 equivalents of acetophenone, about 4.4 equivalents of formaldehyde and about 1.3 equivalents of oleic acid.

11. The method of claim 1 wherein said composition further includes at least one additional compound selected from the group consisting of quaternary ammonium compounds, and aromatic hydrocarbons having high oil wetting characteristics, said additional compound or compounds and said group (i) through group (iv) constituents being different compounds or different mixtures of compounds.

12. The method of claim 1 wherein said composition further includes a surfactant for facilitating dispersion of said condensation product and said antimony compound throughout said aqueous liquid carrier, said surfactant and said group (i) through group (iv) constituents being different compounds or different mixtures of compounds.

13. The method of claim 12 wherein said surfactant is an ethoxylated nonylphenol.

14. The method of claim 1 wherein said condensation product and said antimony compound are present in said composition in a combined amount of from about 1 to about 20 gallons per 1000 gallons of said aqueous liquid carrier.

15. The method of claim 1 wherein said composition has a pH in the range of from about 0 to about 4.

16. The method of claim 1 wherein said aqueous liquid carrier is an aqueous acid solution.

17. A composition for coating antimony comprising:
an aqueous liquid carrier, a condensation product and an antimony compound,
said antimony compound being capable of activation by said condensation product,
said condensation product being prepared by reacting at least four reaction constituents together in the presence of from about 0.8 to about 1.2 equivalents of an aqueous mineral acid catalyst at a temperature in the range of from about 140 to about 250 F. for in the range of from about 4 to about 48 hours, said reaction constituents including:
about one equivalent of a group (i) constituent having at least one reactive hydrogen atom and no groups reactive under the conditions of reaction other than hydrogen, said group (i) constituent including at least one member selected from the group consisting of amines, amides, thioamides, aldehydes, nitrogen heterocycles, ketones, phenols, acetylenic alcohols, carboxylic acids, and esters of carboxylic acids;
from about 0.6 to about 10 equivalents of a group (ii) constituent, said group (ii) constituent including a carbonyl group and having at least one hydrogen atom on the carbon atom adjacent to the carbonyl group;
from about 0.5 to about 10 equivalents of a group (iii) constituent, said group (iii) constituent being an aldehyde; and
from about 0.10 to about 10 equivalents of a group (iv) constituent, said group (iv) constituent being selected from a fatty compound having from 5 to 60 carbon atoms, an alkyl nitrogen heterocycle having at least one alkyl group having from 1 to 18 carbon atoms and 3 to 9 carbon atoms in the heterocyclic ring structure and admixtures thereof, wherein each of said group (i) constituent, group (ii) constituent, group (iii) constituent and group (iv) constituent are different compounds or different mixtures of compounds; and wherein said composition is substantially free of acetylenic alcohols and has a pH below 7.

18. The composition of claim 17 wherein said antimony compound is selected from the group consisting of antimony oxides, antimony chlorides, antimony fluorides, antimony tartrate, antimony citrate, alkali metal salts of antimony tartrate and antimony citrate, alkali metal salts of pyroantimonate, antimony adducts of ethylene glycol and antimony compounds present in solutions containing (i) ethylene glycol, (ii) water and (iii) the oxidized product of hydrogen peroxide and an antimony compound that provides trivalent antimony ions.

19. The composition of claim 17 wherein said antimony compound is an antimony compound present in a solution containing ethylene glycol, water and the oxidized product of hydrogen peroxide and antimony trioxide.

20. The composition of claim 17 wherein said antimony compound is present in said composition in an amount sufficient to impart a molar concentration of antimony ions in said composition of from about 0.0001 to about 0.1.

21. The composition of claim 17 wherein said group (i) constituent is selected from the group consisting of amides, thioamides, aldehydes and ketones.

22. The composition of claim 17 wherein said group (i) constituent is selected from the group consisting of amides, thioamides, aldehydes and ketones, said group (ii) constituent is selected from the group consisting of aromatic substituted aldehydes, aromatic substituted ketones and aliphatic aldehydes, said group (iii) constituent is an aliphatic aldehyde and said group (iv) constituent is selected from the group consisting of carboxylic acids, ethoxylated carboxylic acids, amides and ethoxylated amides.

23. The composition of claim 17 wherein said group (i) constituent is thiourea, said group (ii) constituent is acetophenone, said group (iii) constituent is formaldehyde, said group (iv) constituent is oleic acid, and said aqueous mineral acid catalyst is hydrochloric acid.

24. The composition of claim 17 further comprising at least one additional compound selected from the group consisting of quaternary ammonium compounds and aromatic hydrocarbons having high oil wetting characteristics, said additional compound or compounds and said group (i) through group (iv) constituents being different compounds or different mixtures of compounds.

25. The composition of claim 17 further comprising a surfactant for facilitating dispersion of said condensation product and said antimony compound throughout said aqueous liquid carrier, said surfactant and said group (i) through group (iv) constituents being different compounds or different mixtures of compounds.

26. The composition of claim 17 wherein said condensation product and said antimony compound are present in said composition in a combined amount of from about 1 to about 20 gallons per 1000 gallons of said aqueous liquid carrier.

27. The composition of claim 17 wherein said composition has a pH in the range of from about 0 to about 4.

28. The composition of claim 17 wherein said aqueous liquid carrier is an aqueous acid solution.

29. A composition that forms a protective coating on a metal surface when contacted therewith to inhibit corrosion of the surface comprising:
an aqueous liquid carrier, a condensation product and at least one antimony compound,
said antimony compound(s) being capable of activation by said condensation product and present in said composition in an amount sufficient to impart a molar concentration of antimony ions in said composition of at least about 0.0001,
said condensation product being prepared by reacting at least four reaction constituents together in the presence of from about 0.8 to about 1.2 equivalents of an aqueous mineral acid catalyst at a temperature in the range of from about 140 to about 250 F. for in the range of from about 4 to about 48 hours, said reaction constituents including:
about one equivalent of a group (i) constituent having at least one reactive hydrogen atom and no groups reactive under the conditions of reaction other than hydrogen, said group (i) constituent including at least one member selected from the group consisting of amines, amides, thioamides, aldehydes, nitrogen heterocycles, ketones, phenols, acetylenic alcohols, carboxylic acids and esters of carboxylic acids;
from about 0.6 to about 10 equivalents of a group (ii) constituent, said group (ii) constituent including a carbonyl group and having at least one hydrogen atom on the carbon atom adjacent to the carbonyl group;
from about 0.5 to about 10 equivalents of a group (iii) constituent, said group (iii) constituent being an aldehyde; and
from about 0.10 to about 10 equivalents of a group (iv) constituent, said group (iv) constituent being selected from a fatty compound having from 5 to 60 carbon atoms, an alkyl nitrogen heterocycle having at least one alkyl group having from 1 to 18 carbon atoms and 3 to 9 carbon atoms in the heterocyclic ring structure and admixtures thereof, wherein each of said group (i) constituent, group (ii) constituent, group (iii) constituent and group (iv) constituent are different compounds or different mixtures of compounds; and
wherein said composition is free of acetylenic alcohols.

30. The composition of claim 29 wherein said group (i) constituent is selected from the group consisting of amides, thioamides, aldehydes and ketones, said group (ii) constituent is selected from the group consisting of aromatic substituted aldehydes, aromatic substituted ketones and aliphatic aldehydes, said group (iii) constituent is an aliphatic aldehyde and said group (iv) constituent is selected from the group consisting of carboxylic acids, ethoxylated carboxylic acids, amides and ethoxylated amides.

31. The composition of claim 29 wherein said group (i) constituent is thiourea, said group (ii) constituent is acetophenone, said group (iii) constituent is formaldehyde, said group (iv) constituent is oleic acid, and said aqueous mineral acid catalyst is hydrochloric acid.

32. The composition of claim 29 further comprising at least one additional compound selected from the group consisting of quaternary ammonium compounds and aromatic hydrocarbons having high oil wetting characteristics, said additional compound or compounds and said group (i) through group (iv) constituents being different compounds or different mixtures of compounds.

33. The composition of claim 29 further comprising a surfactant for facilitating dispersion of said condensation product and said antimony compound throughout said aqueous liquid carrier, said surfactant and said group (i) through group (iv) constituents being different compounds or different mixtures of compounds.

34. The composition of claim 29 wherein said composition has a pH in the range of from about 0 to about 4.

* * * * *

UNITED STATES PATENT AND TRADEMARK OFFICE
CERTIFICATE OF CORRECTION

Patent No.: 5,411,670

Dated: May 2, 1995

Inventor(s): Michael L. Walker

It is certified that error appears in the above-identified patent and that said Letters Patent is hereby corrected as shown below:

Column 19, lines 19 through 24, delete ", the method of claim 1 wherein said antimony compound is present in said composition in an amount sufficient to impart a molar concentration of antimony ions in said composition of from about 0.0001 to about 0.1".

Signed and Sealed this

Second Day of January, 1996

*Attest:*

BRUCE LEHMAN

*Attesting Officer*     *Commissioner of Patents and Trademarks*